United States Patent
Prissok et al.

(10) Patent No.: US 11,365,303 B2
(45) Date of Patent: *Jun. 21, 2022

(54) FOAMS BASED ON THERMOPLASTIC POLYURETHANES

(71) Applicant: BASF SE, Ludwigshafen (DE)

(72) Inventors: Frank Prissok, Lemfoerde (DE); Frank Braun, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,216

(22) Filed: Sep. 24, 2020

(65) Prior Publication Data

US 2021/0002446 A1 Jan. 7, 2021

Related U.S. Application Data

(60) Continuation of application No. 15/837,344, filed on Dec. 11, 2017, which is a division of application No. 13/605,673, filed on Sep. 6, 2012, now Pat. No. 9,884,947, which is a division of application No. 12/161,354, filed as application No. PCT/EP2007/050274 on Jan. 12, 2007, now abandoned.

(30) Foreign Application Priority Data

Jan. 18, 2006 (EP) .................................... 06100506

(51) Int. Cl.
| | | |
|---|---|---|
| *C08J 9/16* | (2006.01) | |
| *C08J 9/232* | (2006.01) | |
| *C08J 9/18* | (2006.01) | |
| *A43B 13/04* | (2006.01) | |
| *A43B 13/18* | (2006.01) | |
| *A43B 17/14* | (2006.01) | |
| *C08G 18/48* | (2006.01) | |
| *C08L 75/04* | (2006.01) | |
| *B29B 9/06* | (2006.01) | |
| *B29B 9/12* | (2006.01) | |
| *B29B 9/14* | (2006.01) | |
| *B29B 9/16* | (2006.01) | |
| *A43B 13/02* | (2022.01) | |
| *C08G 18/10* | (2006.01) | |
| *C08G 18/76* | (2006.01) | |
| *C08J 3/12* | (2006.01) | |
| *C08J 9/14* | (2006.01) | |
| *C08G 101/00* | (2006.01) | |
| *C08K 3/32* | (2006.01) | |

(52) U.S. Cl.
CPC ............... *C08J 9/16* (2013.01); *A43B 13/023* (2013.01); *A43B 13/04* (2013.01); *A43B 13/187* (2013.01); *A43B 17/14* (2013.01); *B29B 9/065* (2013.01); *B29B 9/12* (2013.01); *B29B 9/14* (2013.01); *B29B 9/16* (2013.01); *C08G 18/10* (2013.01); *C08G 18/48* (2013.01); *C08G 18/4854* (2013.01); *C08G 18/7657* (2013.01); *C08J 3/12* (2013.01); *C08J 9/141* (2013.01); *C08J 9/18* (2013.01); *C08J 9/232* (2013.01); *C08L 75/04* (2013.01); *C08G 2101/00* (2013.01); *C08G 2410/00* (2013.01); *C08J 2201/03* (2013.01); *C08J 2203/14* (2013.01); *C08J 2375/04* (2013.01); *C08J 2375/08* (2013.01); *C08K 3/32* (2013.01)

(58) Field of Classification Search
CPC ................................. A43B 13/04; A43B 13/25
See application file for complete search history.

(56) References Cited

U.S. PATENT DOCUMENTS

| | | | |
|---|---|---|---|
| 4,464,484 A | 8/1984 | Yoshimura et al. | |
| 4,704,239 A | 11/1987 | Yoshimura et al. | |
| 5,026,736 A | 6/1991 | Pontiff | |
| 5,204,040 A | 4/1993 | Chang | |
| 5,707,573 A | 1/1998 | Biesenberger et al. | |
| 5,900,439 A | 5/1999 | Prissok et al. | |
| 5,908,894 A | 6/1999 | Genz et al. | |
| 6,239,185 B1 | 5/2001 | Braun et al. | |
| 6,723,760 B2 | 4/2004 | Braun | |
| 7,150,615 B2 | 12/2006 | Sugihara et al. | |
| 7,166,247 B2 | 1/2007 | Kramer | |
| 2002/0193459 A1 | 12/2002 | Haseyama et al. | |
| 2003/0105174 A1 | 6/2003 | Braun | |
| 2003/0158275 A1 | 8/2003 | McClelland et al. | |
| 2005/0003032 A1 | 1/2005 | Sugihara et al. | |
| 2005/0153134 A1 | 7/2005 | Sasaki et al. | |
| 2006/0113694 A1 | 6/2006 | Freser-Wolzenburg et al. | |
| 2006/0235095 A1 | 10/2006 | Leberfinger et al. | |
| 2006/0248752 A1 | 11/2006 | Kittner et al. | |

(Continued)

FOREIGN PATENT DOCUMENTS

| | | |
|---|---|---|
| DE | 4015714 A1 | 11/1991 |
| JP | 08113664 A | 5/1996 |
| JP | 10168215 A | 6/1998 |

(Continued)

OTHER PUBLICATIONS

Ullmanns "Encyklopaedie der technischen Chemie", Radionuklide bis Schutzgase, 4 Auflage, Band 20, pages (415-432).

(Continued)

*Primary Examiner* — Liam J Heincer

(74) *Attorney, Agent, or Firm* — Sterne, Kessler, Goldstein & Fox P.L.L.C.

(57) ABSTRACT

Expandable thermoplastic polyurethane comprising blowing agent, wherein the Shore hardness of the thermoplastic polyurethane is from A 44 to A 84.

19 Claims, No Drawings

(56) References Cited

U.S. PATENT DOCUMENTS

2008/0132591 A1    6/2008   Lawrence et al.
2008/0207846 A1    8/2008   Henze et al.

FOREIGN PATENT DOCUMENTS

| WO | 9420568 A1 | 9/1994 |
| WO | 0044821 A1 | 8/2000 |
| WO | 2004108811 A1 | 12/2004 |
| WO | 2005026243 A1 | 3/2005 |

OTHER PUBLICATIONS

Machine translation of JP 08-113664, 2012.
Machine translation of WO 94/20568, 2019.

FOAMS BASED ON THERMOPLASTIC POLYURETHANES

CROSS-REFERENCE TO RELATED APPLICATIONS

This application is a continuation application of prior U.S. application Ser. No. 15/837,344, filed Dec. 11, 2017, the disclosure of which is incorporated herein by reference in its entirety. U.S. application Ser. No. 15/837,344 is a divisional application of prior U.S. application Ser. No. 13/605,673, filed Sep. 6, 2012 (now U.S. Pat. No. 9,884,947, issued Feb. 6, 2018), the disclosure of which is incorporated herein by reference in its entirety. U.S. application Ser. No. 13/605,673 is a divisional application of prior U.S. application Ser. No. 12/161,354, filed Jul. 18, 2008, the disclosure of which is incorporated herein by reference in its entirety. U.S. application Ser. No. 12/161,354 is the National Stage Application of International Application No. PCT/EP2007/050274, filed Jan. 12, 2007, the disclosure of which is incorporated herein by reference in its entirety. Priority in the parent applications is claimed to European Application No. 06100506.2, filed Jan. 18, 2006, the disclosure of which is incorporated herein by reference in its entirety.

DESCRIPTION

The invention relates to expandable thermoplastic polyurethane, preferably in bead form, comprising blowing agent, where the Shore hardness of the thermoplastic polyurethane is from A 44 to A 84, preferably from A 62 to A 82, particularly preferably from A 62 to A 80. The Shore hardness of the TPU here is measured on the compact, i.e. unexpanded, TPU. The invention moreover relates to processes for production of expandable thermoplastic polyurethane, preferably in bead form, comprising blowing agent. The invention also relates to processes for production of expanded thermoplastic polyurethane, and to processes for production of foam based on thermoplastic polyurethane, and to foams or expanded thermoplastic polyurethanes thus obtainable.

Foams, and this particularly applies to moldable foams, have been known for a long time and are widely described in the literature, e.g. in Ullmann's "Encyklopädie der technischen Chemie" [Encyclopedia of Industrial Chemistry], 4th edition, Volume 20, pp. 416 et seq.

DE 4015714 A1 mentions glass fiber-reinforced TPU foams which are produced in an injection-molding machine. The examples state densities of 800 g/L and greater. These are foamed TPU sheets, not moldable foams.

Moldable foams based on thermoplastic polyurethane, also termed TPU in this specification, have been disclosed in WO 94/20568. A disadvantage of the TPU foams described in WO 94/20568 is the high energy consumption during production and processing. A steam pressure of from 4.5 bar to 7 bar is used, i.e. a temperature of from 145° C. to 165° C.

WO 94/20568 also describes expanded, i.e. foamed, TPU beads which can be processed to give moldings. These TPU foam beads are produced at temperatures of 150° C. and higher and in the examples have a bulk density of from 55 to 180 g/L, with resultant disadvantage in transport and storage of these beads due to the increased space required.

The object of the present invention therefore consists in developing a moldable TPU foam which can be produced at low temperatures and simultaneously has good performance in relation to elasticity and to temperature variation. A further object was to develop expandable TPU beads and expanded TPU foam beads, and processes for their production, these being beads which can be produced and processed at low temperatures.

These objects have been achieved via expandable thermoplastic polyurethane, preferably in bead form, comprising blowing agent, where the Shore hardness of the thermoplastic polyurethane is from A 44 to A 84, preferably from A 62 to A 82, particularly preferably from A 62 to A 80. The Shore hardness of the TPU here is measured on the compact, i.e. unexpanded, TPU.

The advantage of the present invention is that it uses TPU with lower hardness, lower melting point, and better flowability. The result is that temperatures and pressures can be kept lower during the production of the expanded TPU beads. Specifically when steam is used, it is advantageous to be able to operate at lower temperatures. Furthermore, the softness makes adhesive-bonding of the foam beads more effective.

According to the invention; preferred TPUs are those in which the melting range measured by DSC with a heating rate of 20 K/min starts below 130° C., more preferably below 120° C., and the thermoplastic polyurethane has at most a melt flow rate (MFR) of 250 g/10 min, particularly preferably smaller than 200 g/10 min at 190° C. with an applied weight of 21.6 kg to DIN EN ISO 1133.

Another advantage of the inventive thermoplastic polyurethanes consists in their better feel.

The inventive TPUs are preferably based on polyether alcohol, particularly preferably polyetherdiol. Polytetrahydrofuran can particularly preferably be used here. It is particularly preferable that the TPU is based on polytetrahydrofuran whose molar mass is from 600 g/mol to 2500 g/mol. The polyether alcohols can be used either individually or else in a mixture with one another.

As an alternative, good results were achieved with TPU based on polyester alcohol, preferably polyesterdiol, particularly preferably derived from adipic acid and 1,4-butanediol, with a molar mass of from 600 g/mol to 900 g/mol.

Thermoplastic polyurethanes and processes for their production are well known. By way of example, TPUs can be produced via reaction of (a) isocyanates with (b) compounds reactive toward isocyanates and having a molar mass of from 500 to 10000 and, if appropriate, (c) chain extenders having a molar mass of from 50 to 499, if appropriate in the presence of (d) catalysts and/or of (e) conventional auxiliaries and/or conventional additives.

The starting components and processes for production of the preferred polyurethanes will be described by way of example below. The components (a), (b), and also, if appropriate, (c), (d) and/or (e) usually used in production of the polyurethanes will be described by way of example below:

a) Organic isocyanates (a) which may be used are well-known aliphatic, cycloaliphatic, araliphatic, and/or aromatic isocyanates, preferably diisocyanates, for example tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'- dimethylbiphenyl diisocyanate, 1,2-diphenylethane diisocyanate, and/or phenylene diisocyanate.

b) Compounds (b) which may be used and are reactive toward isocyanates are the well-known compounds reactive toward isocyanates, for example polyesterols, polyetherols, and/or polycarbonatediols, these usually also being combined under the term "polyols", having molar masses of from 500 to 8000, preferably from 600 to 6000, in particular from 800 to 4000, and preferably having an average functionality of from 1.8 to 2.3, preferably from 1.9 to 2.2, in particular 2.

c) Chain extenders (c) that may be used-comprise well-known aliphatic, araliphatic, aromatic and/or cycloaliphatic compounds having a molar mass of from 50 to 499, preferably difunctional compounds, such as diamines and/or alkanediols having from 2 to 10 carbon atoms in the alkylene radical, in particular 1,4-butanediol, 1,6-hexanediol, and/or di-, tri-, tetra-, penta-, hexa-, hepta-, octa-, nona- and/or decaalkylene glycols having from 3 to 8 carbon atoms, and preferably corresponding oligo- and/or polypropylene glycols, and use may also be made of a mixture of the chain extenders.

d) Suitable catalysts which in particular accelerate the reaction between the NCO groups of the diisocyanates (a) and the hydroxy groups of the structural components (b) and (c) are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo-[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

e) Alongside catalysts (d), conventional auxiliaries and/or additives (e) may also be added to the structural components (a) to (c). By way of example, mention may be made of blowing agents, surface-active substances, fillers, flame retardants, nucleating agents, antioxidants, lubricants and mold-release agents, dyes and pigments, further stabilizers if appropriate in addition to the inventive stabilizer mixture, e.g. with respect to hydrolysis, light, heat or discoloration, inorganic and/or organic fillers, reinforcing agents, and plasticizers. In one preferred embodiment, component (e) also includes hydrolysis stabilizers, such as polymeric and low-molecular-weight carbodiimides. In another embodiment, the TPU can comprise a phosphorus compound. In one preferred embodiment, phosphorus compounds used are organophosphorus compounds of trivalent phosphorus, examples being phosphites and phosphonites. Examples of suitable phosphorus compounds are triphenyl phosphate, diphenyl alkyl phosphate, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, di(2,4-di-tert-butylphenyl) pentaerythritol diphosphite, tristearyl sorbitol triphosphite, tetrakis(2,4-di-tert-butylphenyl) 4,4'-diphenylenediphosphonite, trisisodecyl phosphite, diisodecyl phenyl phosphite, and diphenyl isodecyl phosphite, or a mixture thereof.

The phosphorus compounds are particularly suitable when they are difficult to hydrolyze, since the hydrolysis of a phosphorus compound to give the corresponding acid can lead to degradation of the polyurethane, in particular of the polyester urethane. Accordingly, the phosphorus compounds particularly suitable for polyester urethanes are those which are particularly difficult to hydrolyze. Examples of these phosphorus compounds are dipolypropylene glycol phenyl phosphite, triisodecyl phosphite, triphenyl monodecyl phosphite, trisisononyl phosphite, tris(2,4-di-tert-butylphenyl) phosphite, tetrakis(2,4-di-tert-butylphenyl)-4,4'-biphenylylene diphosphonite, and di(2A-di-tert-butylphenyl)-pentaerythritol diphosphite, or a mixture thereof.

Fillers that can be used are organic and inorganic powders or fibrous materials, or else a mixture thereof. Examples of organic fillers that can be used are wood flour, starch, flax fibers, hemp fibers, ramie fibers, jute fibers, sisal fibers, cotton fibers, cellulose fibers, or aramid fibers. Examples of inorganic fillers that can be used are silicates, barite, glass beads, zeolite, metals or metal oxides. It is preferable to use pulverulent inorganic substances, such as talc, chalk, kaolin, $(Al_2(Si_2O_5)(OH)_4)$, aluminum hydroxide, magnesium hydroxide, aluminum nitrite, aluminum silicate, barium sulfate, calcium carbonate, calcium sulfate, silica, powdered quartz, Aerosil, alumina, mica, or wollastonite, or inorganic substances in the form of beads or fibers, e.g. iron powder, glass beads, glass fibers, or carbon fibers. The average particle diameters or, in the case of fillers in the form of fibers, the length should be in the region of the cell size or smaller. Preference is given to an average particle diameter in the range from 0.1 to 100 µm, preferably in the range from 1 to 50 µm. Preference is given to expandable, thermoplastic polyurethanes comprising blowing agent and comprising from 5 to 80% by weight of organic and/or inorganic fillers, based on the total weight of the thermoplastic polyurethane comprising blowing agent. Further preference is given to expanded thermoplastic polyurethanes which comprise from 5 to 80% by weight of organic and/or inorganic fillers, based on the total weight of the thermoplastic polyurethane.

Besides the components a) and b) mentioned, and if appropriate, c), d) and e), it is also possible to use chain regulators, usually with molar mass of from 31 to 499. These chain regulators are compounds which have only one functional group reactive toward isocyanates, examples being monohydric alcohols, monobasic amines, and/or monohydric polyols. These chain regulators can give precise control of flow behavior, in particular in the case of TPUs. The amount of chain regulators which may generally be used is from 0 to 5 parts by weight, preferably from 0.1 to 1 part by weight, based on 100 parts by weight of component b), and the chain regulators are defined as part of component (c).

All of the molar masses mentioned in this specification have the unit [g/mol].

To adjust the hardness of the TPUs, the molar ratios of the structural components (b) and (c) may be varied relatively widely. Successful molar ratios of component (b) to the entire amount of chain extenders (c) to be used are from 10:1 to 1:10, in particular from 1:1 to 1:4, and the hardness of the TPUs here rises as content of (c) increases.

It is preferable that chain extenders (c) are also used for production of the TPUs.

The reaction can take place at conventional indices, preferably with an index of from 60 to 120, particularly preferably at an index of from 80 to 110. The index is defined via the ratio of the total number of isocyanate groups used during the reaction in component (a) to the number of groups reactive toward isocyanates, i.e. to the active hydrogen atoms, in components (b) and (c). If the index is 100, there is one active hydrogen atom, i.e. one function reactive toward isocyanates, in components (b) and (c) for each isocyanate group in component (a). If indices are above 100, there are more isocyanate groups than OH groups present.

The TPUs can be produced by the known processes continuously, for example using reactive extruders, or the belt process, by the one-shot method or the prepolymer method, or batchwise by the known prepolymer process. The components (a), (b) and, if appropriate, (c), (d), and/or (e) reacting in these processes can be mixed with one another in succession or simultaneously, whereupon the reaction immediately begins.

In the extruder process, structural components (a), (b), and, if appropriate, (c), (d), and/or (e) are introduced individually or in the form of a mixture into the extruder, e.g. at temperatures of from 100 to 280° C., preferably from 140 to 250° C., and reacted, and the resultant TPU is extruded, cooled, and pelletized. It can, if appropriate, be advisable to heat-condition the resultant TPU prior to further processing at from 80 to 120° C., preferably from 100 to 110° C., for a period of from 1 to 24 hours.

According to the invention, the inventive TPUs described at the outset are used for production of the expandable thermoplastic polyurethanes, preferably in bead form, comprising blowing agent, for production of expanded thermoplastic polyurethane, and for production of foam based on thermoplastic polyurethane. The production of these materials from the inventive TPUs is described below.

In principle, the inventive expanded TPU beads can be produced via suspension or extrusion processes directly or indirectly by way of expandable TPU beads and foaming in a pressure prefoamer with steam or hot air.

In the suspension process, the TPU in the form of pellets is heated with water, with a suspending agent, and with the blowing agent in a closed reactor to above the softening point of the pellets. The polymer beads are thereby impregnated by the blowing agent. It is then possible either to cool the hot suspension, whereupon the particles solidify with inclusion of the blowing agent, and to depressurize the reactor. The (expandable) beads comprising blowing agent and obtained in this way are foamed via heating to give the expanded beads. As an alternative, it is possible to depressurize the hot suspension suddenly, without cooling (explosion-expansion process), whereupon the softened beads comprising blowing agent immediately foam to give the expanded beads, see, for example, WO 94/20568.

In the extrusion process, the TPU is mixed, with melting; in an extruder with a blowing agent which is introduced into the extruder. Either the mixture comprising blowing agent is extruded and pelletized under conditions of pressure and temperature such that the TPU pellets do not foam (expand), an example of a method being used for this purpose being underwater pelletization, which is operated with a water pressure of more than 2 bar. This gives expandable beads comprising blowing agent, which are then foamed via subsequent heating to give the expanded beads. Or the mixture can also be extruded and pelletized at atmospheric pressure. In this process, the melt extrudate foams and the product obtained via pelletization is the expanded beads.

The TPU can be used in the form of commercially available pellets, powder, granules, or in any other form. It is advantageous to use pellets. An example of a suitable form is what are known as minipellets whose preferred average diameter is from 0.2 to 10 mm, in particular from 0.5 to 5 mm. These mostly cylindrical or round minipellets are produced via extrusion of the TPU and, if appropriate, of other additives, discharged from the extruder, and if appropriate cooling, and pelletization. In the case of cylindrical minipellets, the length is preferably from 0.2 to 10 mm, in particular from 0.5 to 5 mm. The pellets can also have a lamellar shape. The average diameter of the thermoplastic polyurethane comprising blowing agent is preferably from 0.2 to 10 mm.

The expandable TPU beads of the invention can be produced by the suspension process or by the extrusion process.

As a function of the process used, the preferred blowing agents can vary if appropriate. In the case of the suspension process, the blowing agent used preferably comprises organic liquids or inorganic gases, or a mixture thereof. Liquids that can be used comprise halogenated hydrocarbons, but preference is given to saturated, aliphatic hydrocarbons, in particular those having from 3 to 8 carbon atoms. Suitable inorganic gases are nitrogen. air, ammonia, or carbon dioxide.

In production via an extrusion process, the blowing agent used preferably comprises volatile organic compounds whose boiling point at atmospheric pressure of 1013 mbar is from −25 to 150° C., in particular from −10 to 125° C. Hydrocarbons (preferably halogen-free) have good suitability, in particular $C_{4-10}$-alkanes, for example the isomers of butane, of pentane, of hexane, of heptane, and of octane, particularly preferably secpentane. Other suitable blowing agents are bulkier compounds, examples being alcohols, ketones, esters, ethers, and organic carbonates.

It is also possible to use halogenated hydrocarbons, but the blowing agent is preferably halogen-free. Very small proportions of halogen-containing blowing agents in the blowing agent mixture are however not to be excluded. It is, of course, also possible to use mixtures of the blowing agents mentioned.

The amount of blowing agent is preferably from 0.1 to 40 parts by weight, in particular from 0.5 to 35 parts by weight, and particularly preferably from 1 to 30 parts by weight, based on 100 parts by weight of TPU used.

In the suspension process, operations are generally carried out batchwise in an impregnator, e.g. in a stirred-tank reactor. The TPU is fed, e.g. in the form of minipellets, into the reactor, as also is water or another suspension medium, and the blowing agent and, if appropriate, a suspending agent. Water-insoluble inorganic stabilizers are suitable as suspending agent, examples being tricalcium phosphate, magnesium pyrophosphate, and metal carbonates; and also polyvinyl alcohol and surfactants, such as sodium dodecylarylsulfonate. The amounts usually used of these are from 0.05 to 10% by weight, based on the TPU.

The reactor is then sealed, and the reactor contents are heated to an impregnation temperature which is usually at least 100° C. The blowing agent here can be added prior to, during, or after heating of the reactor contents. The impregnation temperature should be in the vicinity of the softening point of the TPU. Impregnation temperatures of from 100 to 150° C., in particular from 110 to 145° C., are preferred.

As a function of the amount and nature of the blowing agent, and also of the temperature, a pressure (impregnation pressure) becomes established in the sealed reactor and is generally from 2 to 100 bar (absolute). The pressure can, if necessary, be regulated via a pressure-control valve or via introduction of further blowing agent under pressure. At the elevated temperature and superatmospheric pressure provided by the impregnation conditions, blowing agent diffuses into the polymer pellets. The impregnation time is generally from 0.5 to 10 hours.

In one embodiment of the suspension process, cooling of the heated suspension, usually to below 100° C., takes place after the impregnation process, the result being re-solidification of the TPU and inclusion of the blowing agent. The material is then depressurized. The product is expandable TPU beads which finally are conventionally isolated from the suspension. Adherent water is generally removed via drying, e.g. in a pneumatic dryer. Subsequently or previously, if necessary, adherent suspending agent can be removed by treating the beads with a suitable reagent. By way of example, treatment with an acid, such as nitric acid, hydrochloric acid, or sulfuric acid, can be used in order to remove acid-soluble suspending agents, e.g. metal carbonates or tricalcium phosphate.

In the extrusion process, it is preferable that the TPU, the blowing agent and, if appropriate, additives are introduced together (in the form of a mixture) or separately from one another at one or various locations of the extruder. The possibility, but not a requirement, here is to prepare a mixture in advance from the solid components. By way of example, it is possible to begin by mixing TPU and, if appropriate, additives, and to introduce the mixture into the extruder, and then introduce the blowing agent into the extruder, so that the extruder mixes the blowing agent into to polymer melt. It is also possible to introduce a mixture of blowing agent and additives into the extruder, i.e. to premix the additives with the blowing agent.

In the extruder, the starting materials mentioned are mixed, with melting of the TPU. Any of the conventional screw-based machines can be used as extruder, in particular single-screw and twin-screw extruders (e.g. Werner & Pfleiderer ZSK machines), co-kneaders, Kombiplast machines, MPC kneading mixers, FCM mixers, KEX kneading screw extruders, and shear-roll extruders, as described by way of example in Saechtling (ed.), Kunststoff-Taschenbuch [Plastics handbook], 27th edition, Hanser-Verlag Munich 1998, chapter 3.2.1 and 3.2.4. The extruder is usually operated at a temperature at which the TPU is present in the form of a melt, for example at from 150 to 250° C., in particular from 180 to 210° C.

The rotation, length, diameter, and design of the extruder screw(s), amounts introduced, and extruder throughput, are selected in a known manner in such a way as to give uniform distribution of the additives in the extruded TPU.

In one embodiment of the extrusion process, expandable beads are produced. To prevent premature foaming of the melt comprising blowing agent on discharge from the extruder, the melt extrudate is discharged from the extruder and pelletized under conditions of temperature and pressure such that practically no foaming (expansion) occurs. These conditions can vary as a function of the type and amount of the polymers, of the additives, and in particular of the blowing agent. The ideal conditions can-easily be determined via preliminary experiments.

One industrially advantageous method is underwater pelletization in a waterbath whose temperature is below 100° C. and which is subject to a pressure of at least 2 bar (absolute). Excessively low temperature has to be avoided, because otherwise the melt hardens on the die plate, and excessively high temperature has to be avoided since otherwise the melt expands. As the boiling point of the blowing agent increases and the amount of the blowing agent becomes smaller, the permissible water temperature becomes higher and the permissible water pressure becomes lower. In the case of the particularly preferred blowing agent sec-pentane, the ideal waterbath temperature is from 30 to 60° C. and the ideal water pressure is from 8 to 12 bar (absolute). It is also possible to use other suitable coolants instead of water. It is also possible to use water-cooled die-face pelletization. In this process, encapsulation of the cutting chamber is such as to permit operation of the pelletizing apparatus under pressure.

The product is expandable TPU beads, which are then isolated from the water and, if appropriate, dried. They are then foamed as described at a later stage below, to give expanded TPU beads.

A preferred process for production of expandable TPU beads comprising blowing agent comprises the following stages:
  i) melting of TPU, if appropriate with additives, and extrusion to give pellets whose average diameter is from 0.2 to 10 mm,
  ii) impregnation of the pellets with from 0.1 to 40% by weight, based on the total weight of the pellets, of a volatile blowing agent in aqueous suspension under pressure, preferably at a pressure of from 5 to 100 bar, at temperatures in the range from 100 to 150° C.,
  iii) cooling of the suspension to from 20 to 95° C.,
  iv) then depressurizing.

Via cooling, the blowing agent becomes included within the polymer, and the product does not foam. If the tank is depressurized directly at high temperatures in step ii), the blowing agent escapes, and the polymer, which is soft at these temperatures, expands.

Another preferred process for production of expandable TPU beads comprising blowing agent comprises the following stages:
  i) melting of TPU together with from 0.1 to 40% by weight, based on the total weight of the pellets, of a volatile blowing agent and, if appropriate, with additives, in an extruder,
  ii) discharge of the melt from the extruder and underwater pelletization of the melt extrudate at pressures of from 2 bar to 20 bar and temperatures of from 5° C. to 95° C.

This process uses pelletization under water against superatmospheric pressure to avoid escape of the blowing agent and foaming of the polymer.

The invention therefore also provides, and this is particularly preferred, a process for production of expandable thermoplastic polyurethane, preferably in bead form, comprising blowing agent, where a thermoplastic polyurethane whose Shore hardness is from A 44 to A 84, preferably from A 62 to A 80, is extruded, if appropriate together with additives, to give pellets whose average diameter is from 0.2 to 10 mm, the pellets are impregnated with from 0.1 to 40% by weight, based on the total weight of the pellets, of a preferably volatile blowing agent in aqueous suspension under pressure, preferably at a pressure of from 5 to 100 bar, at temperatures in the range from 100 to 150° C., the suspension comprising the thermoplastic polyurethanes comprising blowing agent is cooled to from 20 to 95° C., and then the thermoplastic polyurethanes comprising blowing agent are depressurized.

The invention therefore also provides, and this is particularly preferred, a process for production of expandable thermoplastic polyurethane, preferably in bead form, comprising blowing agent, where a thermoplastic polyurethane whose Shore hardness is from A 44 to A 84, preferably from A 62 to A 80, is melted together with from 0.1 to 40% by weight, based on the total weight of the pellets, of a preferably volatile blowing agent and, if appropriate, with additives, in an extruder, and the melt is pelletized under water at pressures of from 2 bar to 20 bar and temperatures of from 5° C. to 95° C.

To the extent that expandable beads are obtained, these can be foamed in a known manner, whereupon the inventive expanded TPU beads are produced. The foaming generally takes place via heating of the expandable beads in conventional foaming apparatuses, e.g. with hot air or superheated steam in what is known as a pressure prefoamer, for example of the type usually used for processing of expandable polystyrene (EPS). It is preferable to foam the beads at a temperature at which they soften (softening range), particularly preferably at temperatures of from 100 to 140° C.

The present invention therefore also provides a process for production of foams based on thermoplastic polyurethane, where the inventive expandable thermoplastic polyurethane, preferably in bead form, comprising blowing agent is foamed at a temperature of from 100° C. to 140° C. The present invention also provides foams thus obtainable and based on thermoplastic polyurethane.

If steam is used for foaming, the steam pressure is usually, as a function of the nature and amount of TPU and blowing agent, and of the desired density of the foam to be produced, from 1 to 4 bar (absolute), preferably from 1.5 to 3.5 bar (absolute). As the pressures increase here the densities of the foamed TPU product become smaller, i.e. steam pressure can be used to set the desired density. The foaming time is usually from 1 to 300 sec, preferably from 1 to 30 sec. Foaming is followed by depressurization and cooling. The expansion factor during foaming is preferably from 2 to 50.

In one embodiment of the suspension process for production of the expanded TPU beads, the heated suspension is not cooled, but depressurized suddenly while hot, without cooling. During depressurization, the blowing agent which has previously diffused into the TPU beads expands "explosively" and foams the softened beads. Expanded TPU beads are obtained.

The suspension is usually depressurized via a die, a valve, or another suitable apparatus. The suspension can be directly depressurized to atmospheric pressure, such as 1013 mbar. However, it is preferable to depressurize in an intermediate container whose pressure is sufficient for foaming of the TPU beads but can be above atmospheric pressure. A suitable method depressurizes to a pressure of, for example, from 0.5 to 5 bar (absolute), in particular from 1 to 3 bar (absolute). During the depressurization process, the impregnation pressure in the impregnation container can be kept constant, by introducing further blowing agent under pressure. The method generally used comprises cooling of the suspension after depressurization, isolation of the expanded TPU beads conventionally from the suspension, and, before that or after that, if appropriate, removal of adherent suspending agent, as described above, and finally washing and drying of the beads.

In one embodiment of the extrusion process for production of the expanded TPU beads, the melt comprising blowing agent is discharged from the extruder and pelletized without underwater pelletization, water-cooled die-face pelletization or other precautions which inhibit foaming. By way of example, extrusion can take place directly into the atmosphere. The melt extrudate discharged from the extruder foams during this process, and expanded TPU beads are obtained via pelletization of the foamed extrudate.

A preferred process for production of expanded TPU beads comprises the following stages
  i) melting of TPU, if appropriate with additives, and extrusion to give minipellets whose average diameter is from 0.2 to 10 mm,
  ii) impregnation of the minipellets with from 0.1 to 40% by weight, based on the total weight of the pellets, of a volatile blowing agent in aqueous suspension under pressure, preferably at a pressure of from 5 to 100 bar, at temperatures in the range from 100 to 150° C., and
  iii) then depressurization.

Another preferred process for expansion of expanded TPU beads comprises the following stages:
  i) melting of TPU together with from 0.1 to 40% by weight, based on the total weight of the pellets, of a volatile blowing agent and, if appropriate, with additives; in an extruder,
  ii) discharge of the melt from the extruder and pelletization of the melt extrudate without apparatuses which inhibit foaming.

The invention also provides, and this is particularly preferred, a process for production of expanded thermoplastic polyurethane, where a thermoplastic polyurethane whose Shore hardness is from A 44 to A 84, preferably from A 62 to A 80, is extruded, if appropriate together with additives, to give pellets whose average diameter is from 0.2 to 10 mm, the pellets are impregnated with from 0.1 to 40% by weight, based on the total weight of the pellets, of a preferably volatile blowing agent, preferably in aqueous suspension under pressure, preferably at a pressure of from 5 to 100 bar, at temperatures in the range from 100 to 150° C., and then are depressurized.

The invention also provides, and this is particularly preferred, a process for production of expanded thermoplastic polyurethane, where a thermoplastic polyurethane whose Shore hardness is from A 44 to A 84, preferably from A 62 to A 80, is melted together with from 0.1 to 40% by weight, based on the total weight of the pellets, of a preferably volatile blowing agent, if appropriate with additives, in an extruder, and the melt is pelletized without apparatuses which inhibit foaming.

The present invention also provides expanded thermoplastic polyurethanes obtainable via these process.

The TPU beads can be provided, prior to and/or after the foaming process, with an antiblocking agent. Examples of suitable antiblocking agents are talc, metal compounds, such as tricalcium phosphate, calcium carbonate, silicas, in particular fumed silicas, such as Aerosil® from Degussa, salts of long-chain (e.g. $C_{10-22}$) carboxylic acids, for example stearic salts, such as calcium stearate, esters of long-chain carboxylic acids, e.g. glycerol esters, such as the glycerol stearates, and silicone oils. The antiblocking agent is generally applied to the beads via mixing, spray application, drum application, or other conventional processes. It is usually used in amounts of from 0.01 to 20 parts by weight, preferably from 0.1 to 10 parts by weight, particularly preferably from 0.5 to 6 parts by weight, based on 100 parts by weight of the TPU.

In all cases the product is expanded TPU beads. Preferred densities are from 5 to 600 g/l, and particularly preferably from 10 to 300 g/l.

The expanded beads are generally at least approximately spherical and their diameter is usually from 0.2 to 20 mm, preferably from 0.5 to 15 mm, and in particular from 1 to 12 mm. In the case of non-spherical, e.g. elongate or cylindrical, beads, diameter means the longest dimension.

Foams can be produced from the inventive expanded TPU beads, for example by fusing them to one another in a closed mold with exposure to heat. For this, the beads are charged to the mold and, once the mold has been closed, steam or hot air is supplied, thus further expanding the beads and fusing them to one another to give foam, whose density is preferably in the range from 8 to 600 g/l. The foams can be semifinished products, for example sheets, profiles, or webs, or finished moldings with simple or complicated geometry. The expression TPU foam therefore includes semifinished foam products and includes foam moldings.

The temperature during the fusion of the expanded TPU beads is preferably from 100° C. to 140° C. The present invention therefore also provides processes for production of foam based on thermoplastic polyurethane, where the inventive expanded thermoplastic polyurethane is fused by means of steam at a temperature of from 100° C. to 140° C., to give a molding.

The invention also provides for the use of the expanded TPU beads for production of TPU foams, and provides TPU foams obtainable from the expanded TPU beads.

The inventive foams can be recycled by a thermoplastic route without difficulty. For this, the foamed TPUs are extruded, using a vented extruder, and there can be mechanical comminution prior to this extrusion process. They can then be, processed again to give foams in the manner described above.

The inventive foams are preferably used in energy-absorbing moldings and in moldings for automobile interiors.

Particular preference is therefore also given to the following products comprising the inventive foams: helmet shells, knee protectors, elbow protectors, shoe soles, midsoles, insoles, and the following parts which comprise the inventive foams: steering wheel parts, door side parts, and foot well parts.

The examples below are intended for further illustration of the invention:

TABLE 1

| TPU | Soft phase Composition [mol] | | | Molar mass [g/mol] | Thermoplastic polyurethane Composition [mol] | | | Shore hardness |
|---|---|---|---|---|---|---|---|---|
| | Adipic acid | 1,4-Butane-diol | Poly-THF | | Soft phase | 1,4-Butane-diol | 4,4'-MDI | |
| A | 1 | 1 | — | 800 | 1.00 | 0.44 | 1.44 | A78 |
| B | — | — | 1 | 1333 | 1.00 | 0.97 | 1.97 | A72 |

The Shore hardness of the PU elastomers was determined to DIN 53 505.

EXAMPLE 1

Foam Bead Production 100 parts of the TPUs stated in Table 1 in the form of pellets each weighing about 2 mg, 250 parts by weight of water, 6.7 parts of tricalcium phosphate, and 20 parts of n-butane were introduced, with stirring, into an autoclave and heated to the temperature stated in Table 2. The contents of the pressure vessel were then discharged through a basal valve and depressurized, while the pressure in the tank was kept constant by introducing, under pressure, nitrogen or the blowing agent used. The foam beads were freed from adherent residues of auxiliaries via washing with nitric acid and water and were air-dried at 50° C.

The impregnation conditions and the resultant bulk densities of the expanded beads are found in Table 2.

TABLE 2

| TPU of Table 1 | n-Butane [parts by weight] | Temperature [° C.] | Bulk density [g/L] |
|---|---|---|---|
| A | 20 | 112 | 300 |
| A | 20 | 114 | 170 |
| B | 20 | 119 | 240 |
| B | 20 | 120 | 190 |

TABLE 2-continued

| TPU of Table 1 | n-Butane [parts by weight] | Temperature [° C.] | Bulk density [g/L] |
|---|---|---|---|
| B | 20 | 122 | 140 |
| B | 20 | 125 | 120 |

EXAMPLE 2

Production of Moldings

The foam beads produced in Example 1 were charged into a preheated mold, with pressure and compaction. The mold was heated by steam at from 1.0 to 4.0 bar, i.e. at temperatures of from 100° C. to 140° C., on alternate sides.

The mold was then depressurized and cooled with water and, respectively, air, and opened, and the mechanically stable molding was removed.

The invention claimed is:

1. A method of making a sole for an article of footwear, the method comprising:
   expanding thermoplastic polyurethane beads having a Shore hardness between A 44 and A 84; and
   fusing the expanded thermoplastic polyurethane beads to one another to form the sole.

2. The method of claim 1, wherein the sole comprises a midsole.

3. The method of claim 2, wherein the midsole consists of the expanded thermoplastic polyurethane beads.

4. The method of claim 2, wherein the expanded thermoplastic polyurethane beads form the entire midsole.

5. The method of claim 1, wherein the sole comprises an insole.

6. The method of claim 1, wherein the expanded thermoplastic polyurethane beads form the entire sole.

7. The method of claim 1, wherein the expanded thermoplastic polyurethane beads are based on a polyether alcohol.

8. The method of claim 1, wherein the expanded thermoplastic polyurethane beads are based on a polyester alcohol.

9. The method of claim 1, wherein the expanded thermoplastic polyurethane beads have a diameter between 0.2 mm and 20 mm.

10. The method of claim 9, wherein the diameter is between 0.5 mm and 15 mm.

11. The method of claim 9, wherein the diameter is between 1 mm and 12 mm.

12. The method of claim 1, wherein the expanded thermoplastic polyurethane beads are spherical.

13. The method of claim 1, wherein the expanded thermoplastic polyurethane beads are cylindrical.

14. The method of claim 1, wherein the expanded thermoplastic polyurethane beads are elongate.

15. The method of claim 1, wherein the expanded thermoplastic polyurethane beads have a density between 8 g/l and 600 g/l.

16. The method of claim 1, wherein the expanded thermoplastic polyurethane beads have a density between 10 g/l and 300 g/l.

17. The method of claim 1, wherein fusing the expanded thermoplastic polyurethane beads to one another to form the sole comprises placing the expanded thermoplastic polyurethane beads in a closed mold and exposing the expanded thermoplastic polyurethane beads to heat.

18. The method of claim 17, wherein exposing the expanded thermoplastic polyurethane beads to heat comprises exposing the expanded thermoplastic polyurethane beads to a temperature between 100° C. and 140° C.

19. The method of claim 17, wherein exposing the expanded thermoplastic polyurethane beads to heat comprises exposing the expanded thermoplastic polyurethane beads to steam at a temperature between 100° C. and 140° C.

* * * * *